United States Patent
Yamashita

(10) Patent No.: US 8,583,077 B2
(45) Date of Patent: Nov. 12, 2013

(54) SAFETY CONFIRMATION SYSTEM, MOBILE TERMINAL FOR USE IN SAFETY CONFIRMATION SYSTEM, AND SAFETY CONFIRMATION METHOD

(75) Inventor: Takahiro Yamashita, Tokyo (JP)

(73) Assignee: Rio Co., Ltd., Tokyo (JP)

( * ) Notice: Subject to any disclaimer, the term of this patent is extended or adjusted under 35 U.S.C. 154(b) by 0 days.

(21) Appl. No.: 13/481,056

(22) Filed: May 25, 2012

(65) Prior Publication Data

US 2012/0302199 A1    Nov. 29, 2012

(30) Foreign Application Priority Data

May 25, 2011    (JP) ................................. 2011-117347

(51) Int. Cl.
*H04M 11/04*    (2006.01)

(52) U.S. Cl.
USPC .................. 455/404.2; 455/404.1; 455/407; 455/408

(58) Field of Classification Search
USPC ............. 455/404.2, 414.2, 456.2, 404.1, 407, 455/408
See application file for complete search history.

(56) References Cited

U.S. PATENT DOCUMENTS

| | | | | |
|---|---|---|---|---|
| 2005/0164673 A1* | 7/2005 | Ehlers | ...................... | 455/404.1 |
| 2007/0049259 A1* | 3/2007 | Onishi et al. | ............... | 455/414.2 |
| 2008/0139165 A1* | 6/2008 | Gage et al. | ................. | 455/404.1 |

FOREIGN PATENT DOCUMENTS

| | | |
|---|---|---|
| JP | 2007-147340 A | 6/2007 |
| JP | 2008-158751 A | 7/2008 |
| JP | 2010-087683 | 4/2010 |
| JP | 2010-263562 | 11/2010 |
| JP | 2011-091720 A | 5/2011 |

OTHER PUBLICATIONS

Japanese Office Action with partial English Translation issued in Japanese Application No. 2011-117347 mailed May 7, 2013.

\* cited by examiner

*Primary Examiner* — Wayne Cai
*Assistant Examiner* — Chuck Huynh
(74) *Attorney, Agent, or Firm* — McDermott Will & Emery LLP

(57) ABSTRACT

A safety confirmation system includes a mobile terminal that receives early disaster information, a center apparatus that manages a safety status of a user of the mobile terminal, and a map server that provides map information. The mobile terminal holds destination information and automatically acquires current location information upon receiving the early disaster information. The mobile terminal automatically transmits the current location information to the center apparatus and the map server, and automatically transmits the destination information to the map server. The center apparatus receives the current location information transmitted from the mobile terminal. The map server searches for a return route from the current location to a destination, generates map information including the return route, and transmits the map information to the mobile terminal. The mobile terminal receives and stores the map information including the return route and displays the map information.

8 Claims, 7 Drawing Sheets

SAFETY CONFIRMATION SYSTEM, MOBILE TERMINAL FOR USE IN SAFETY CONFIRMATION SYSTEM, AND SAFETY CONFIRMATION METHOD

BACKGROUND OF THE INVENTION

1. Field of the Invention

The present invention relates to a safety confirmation system for confirming safety of a user based on current location information of a mobile terminal and, more particularly, to a safety confirmation system and a safety confirmation method utilizing an early disaster information (or disaster quick report) delivery service for the mobile terminal. The present invention further relates to a mobile terminal for use in the safety confirmation system and a computer program implemented in the mobile terminal.

2. Description of Related Art

It is very important to confirm safety of family members or friends after occurrence of a disaster such as an earthquake, and in recent years, a system that uses a mobile terminal to confirm the safety is proposed.

For example, Japanese Patent Application Laid-Open No. 2010-087683 describes the following system. A mobile terminal transmits a disaster reception signal to a center apparatus upon receiving early disaster information, and the center apparatus confirms presence/absence of a movement of the mobile terminal based on current location information of the mobile terminal upon receiving the disaster reception signal from the mobile terminal and determines that a user of the mobile terminal is in an emergency state when the movement of the mobile terminal cannot be confirmed. In this system, the user of the mobile terminal inputs a safety status indicating whether the user is safe or not and transmit a safety confirmation signal from the mobile terminal, whereby the safety status of the user is determined.

Further, Japanese Patent Application Laid-Open Publication No. 2010-263562 proposes a system in which safety information is shared by an information-sharing group upon occurrence of a disaster. In this system, when a disaster occurs, a disaster information management server delivers disaster information indicating disaster areas, evacuation area, and the like. Upon receiving the disaster information, a mobile terminal uses a GPS function to create terminal location information, determines a safety status of a user of the mobile terminal based on the disaster information and terminal location information, creates safety information indicating the safety status of the user, and transmits the safety information and the terminal location information to another mobile terminal previously registered in the same information-sharing group.

Most people put priority on ensuring their safety during and immediately after occurrence of an earthquake and therefore they fail to make a move to conform the safety of their family members or friends. On the other hand, after elapse of a certain time from the end of the earthquake, most people start calling or emailing for the safety confirmation, and thus mobile-service providers previously shut down telephone lines or significantly restrict the number of available lines so as to prevent their lines from being flooded. It is said that the above certain time is about ten minutes. Thus, it is not actually possible to make the safety confirmation by using the telephone lines after elapse of about ten minutes after the end of the earthquake.

The systems described in Japanese Patent Application Laid-Open Publication Nos. 2010-087683 and 2010-263562 can confirm the safety of users of the mobile terminals but fail to assist actions after the disaster. For example, immediately after a big earthquake, power outage, fire, water pipe explosion, road cave-in, sediment disaster, and/or the like may occur to cause a traffic jam, making it difficult for the people to return home when they have been involved in the disaster at a place away from home. Train services are halted for a long time, and buses and taxis are stuck in traffic jams, so that movement of the people is significantly restricted. It follows that the people are forced to walk home or to their offices.

However, in most cases, many people do not grasp how to return home or to the offices from where they are now, and they may be at a loss in an unexpected fashion. Even if a direction toward the destination is roughly known, it is unexpectedly difficult to get to the destination through roads that have never been used before. As a result, it may take a long time to get home due to going wrong way and, in the worst case, they cannot get home before the day is done. Further, it can be imagined that they may get overtired and give up returning home.

Further, there is recently known a web service that acquires current location information using a GPS function of a mobile phone and displays on a map a shortest path to a predetermined destination from the current location. However, in the situation where the telephone lines are shut down or significantly restricted, such a service cannot be provided.

SUMMARY

The present invention has been made to solve the above problems, and an object thereof is to provide a safety confirmation system and a safety confirmation method capable of assisting a user of a mobile terminal to return home as well as providing safety confirmation. Another object of the present invention is to provide a mobile terminal suitably used in the safety confirmation system and a computer program to be implemented in the mobile terminal.

To solve the above problems, according to an aspect of the present invention, there is provided a safety confirmation system including: a mobile terminal that receives early disaster information; a center apparatus that manages a safety status of a user of the mobile terminal; and a map server that provides map information. The mobile terminal includes: a destination information holding section that holds destination information; a current location information acquisition section that automatically acquires current location information upon receiving the early disaster information; a location information transmission section that automatically transmits the current location information to the center apparatus and the map server, as well as automatically transmits the destination information to the map server; a map information acquisition section that receives and stores map information including a return route from a current location to a destination; and a display section that displays the map information. The center apparatus includes a location information reception section that receives the current location information transmitted from the mobile terminal. The map server includes: a return route search section that searches for a return route from the current location to a destination based on the current location information and destination information; a map information generation section that generates the map information including the return route; and a map information transmission section that transmits the map information to the mobile terminal.

According to the present invention, it is possible to provide a map including the return route from the current location to a predetermined destination by using the current location information for safety confirmation. This assists a return of the user of the mobile terminal to his or her home or office. Particularly, in the present invention, the mobile terminal transmits the current location information and receives the map information automatically, i.e., immediately after receiving the early disaster information without intervention of operation of the user, so that minimum required processing can be completed before mobile phone lines become busy, thereby increasing reliability of the safety confirmation system.

In the present invention, it is preferable that a plurality of destinations is registered in advance in the mobile terminal. In this case, it is preferable that the plurality of destinations include first and second destinations, that the mobile terminal transmits the current location information and the first and second destinations to the map server, and that the map server transmits to the mobile terminal first map information including a return route from the current location to the first destination and second map information including a return route from the current location to the second destination. This configuration allows acquisition of both the return routes to, e.g., a home and an office, increasing convenience. Further, giving priorities to the destinations so as to transmit a higher priority destination allows a highly reliable system to be provided.

In the present invention, it is preferable that the mobile terminal selects one of the plurality of destinations that is closest to the current location and transmits the destination information of the selected destination to the map server. This configuration allows adequate map information to be provided according to a place at which the user of the mobile terminal is involved in a disaster, thereby providing a highly convenient system.

In the present invention, it is preferable that the center apparatus further includes a location information transmission section that automatically transmits, upon receiving the current location information from the mobile terminal, the current location information to another mobile terminal. This configuration allows immediate notification of the current location of the user of the mobile terminal at which he or she is present upon occurrence of a disaster to specified persons such as family members, thereby providing a highly convenient system.

In the present invention, it is preferable that the mobile terminal further includes a safety confirmation information input section that receives an input of safety confirmation information after automatically transmitting the current location information and a safety confirmation information transmission section that transmits the safety confirmation information and that the center apparatus further includes a safety confirmation information reception section that receives the safety confirmation information and a safety confirmation information management section that manages the safety confirmation information. Acquisition timings of the current location information and safety confirmation information are separated from each other so as to preferentially collect the current location information, preventing the user of the mobile terminal from being lost completely. Further, the safety confirmation information is input and transmitted by operation of the user of the mobile terminal, increasing reliability of the safety confirmation information.

In the present invention, it is preferable that the center apparatus automatically transmits, upon receiving the safety confirmation information from the mobile terminal, the safety confirmation information to the another mobile terminal. This configuration allows immediate notification of a safety status of the user of the mobile phone upon occurrence of a disaster to specified persons such as family members, thereby providing a highly convenient system.

The above problems of the present invention can also be solved by a mobile terminal including: an early disaster information reception section that receives an early disaster information; a destination information holding section that holds destination information; a current location information acquisition section that automatically acquires current location information upon receiving the early disaster information; a location information transmission section that automatically transmits the current location information to a center apparatus and a map server, as well as automatically transmits the destination information to the map server; a map information acquisition section that receives and stores map information including a return route from a current location to a predetermined destination; and a display section that displays the map information.

It is preferable that the mobile terminal according to the present invention further includes: a safety confirmation information input section that receives an input of safety confirmation information after automatically transmitting the current location information; and a safety confirmation information transmission section that transmits the safety confirmation information to the center apparatus. Acquisition timings of the current location information and safety confirmation information are separated from each other so as to preferentially collect the current location information, preventing the user of the mobile terminal from being lost completely. Further, the safety confirmation information is input and transmitted by operation of the user of the mobile terminal, increasing reliability of the safety confirmation information.

The above problems of the present invention can be solved by a safety confirmation method executed by a mobile terminal having an early disaster information reception function and a location information acquisition function, the method including the steps of: receiving an input of destination information; automatically acquiring current location information upon receiving the early disaster information; automatically transmitting the current location information to a center apparatus and a map server, as well as automatically transmitting the destination information to the map server; receiving and storing map information including a return route from a current location to a predetermined destination; and displaying the map information.

It is preferable that the safety confirmation method according to the present invention executed by the mobile terminal further includes the steps of: receiving an input of safety confirmation information after automatically transmitting the current location information; and transmitting the safety confirmation information to the center apparatus. Acquisition timings of the current location information and safety confirmation information are separated from each other so as to preferentially collect the current location information, preventing the user of the mobile terminal from being lost completely. Further, the safety confirmation information is input and transmitted by operation of the user of the mobile terminal, increasing reliability of the safety confirmation information.

As described above, according to the present invention, a safety confirmation system and a safety confirmation method capable of assisting a user of a mobile terminal to return home as well as providing safety confirmation can be provided. Further, according to the present invention, a mobile terminal achieving the above safety confirmation system and a computer program to be implemented in the mobile terminal can be provided.

BRIEF DESCRIPTION OF THE DRAWINGS

The above and other features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described in detail hereinafter with reference to the accompanying drawings.

Figure 1:
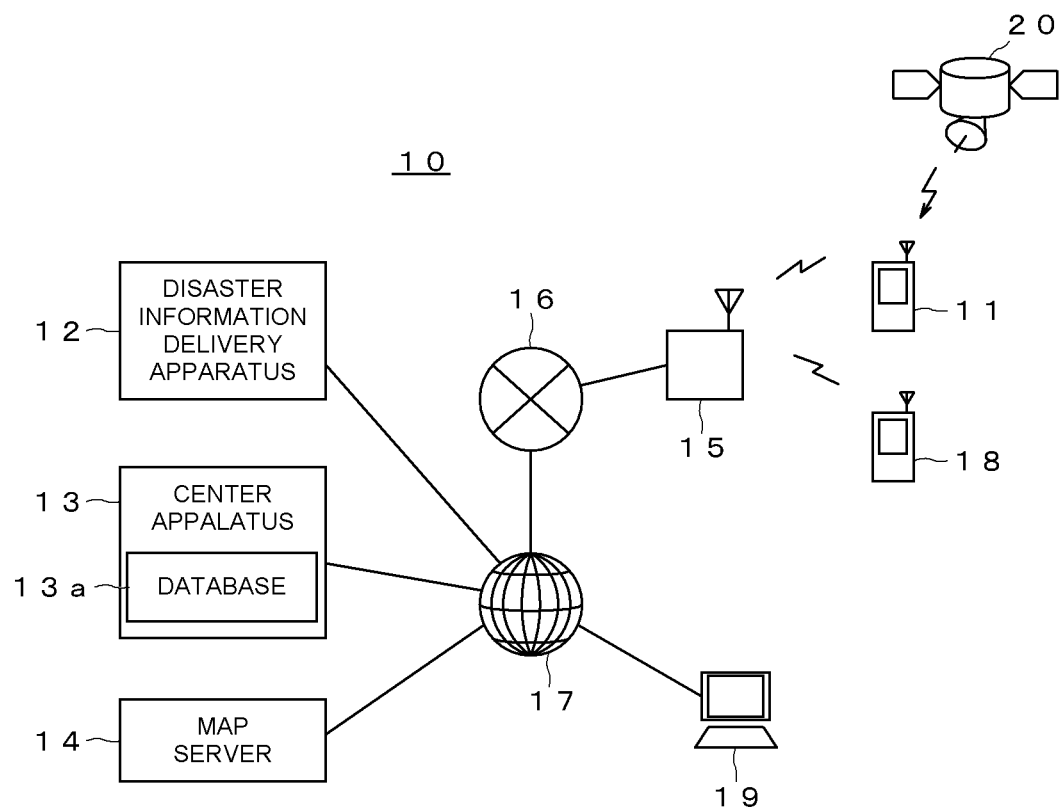
FIG. 1 is an exemplary view illustrating a configuration of a safety confirmation system according to a preferred embodiment of the present invention.

FIG. 1 is an exemplary view illustrating a configuration of a safety confirmation system according to a preferred embodiment of the present invention.

As illustrated in FIG. 1, a safety confirmation system 10 according to the present embodiment includes a mobile terminal 11 owned by a user, a disaster information delivery apparatus 12 that delivers an emergency earthquake alert (an earthquake early warning) to the mobile terminal 11, a center apparatus 13 that manages a safety status of the user, and a map server 14 that creates map information. The mobile terminal 11 is connected to a public communication line (public telephone network) 16 through a base station 15, and the public communication line 16 is connected to the Internet 17. The disaster information delivery apparatus 12, the center apparatus 13, and the map server 14 are connected to the Internet 17. The mobile terminal 18 serves as a notification destination (e.g., user's home or office) of safety information of the user of the mobile terminal 11. A personal computer 19 is a terminal apparatus used for confirming the safety information of the user of the mobile terminal 11 through the Internet 17.

The mobile terminal 11 is a communication terminal (e.g., mobile phone) having a wireless communication function. In addition to the narrowly-defined "mobile phone", a smartphone, a PDA, a personal computer, a navigation device, or the like maybe adopted as the mobile terminal 11. The mobile terminal 11 receives the emergency earthquake alert from the disaster information delivery apparatus 12, prompts the user to input safety confirmation information, and notifies the center apparatus 13 of the safety confirmation information.

The mobile terminal 11 receives a GPS signal from a GPS satellite 20, calculates current location information (longitude/latitude information), and transmitting the current location information to the center apparatus 13. The current location information is not limited to that acquired only by using the GPS signal. For example, by further using location information of a base station, location information of a wireless LAN, and the like, accuracy of the current location information can be increased.

The disaster information delivery apparatus 12 is a computer system managed by a carrier that provides a disaster information delivery service. When an earthquake occurs, the disaster information delivery apparatus 12 receives information such as earthquake epicenter and magnitude analyzed by an organization such as Japan Meteorological Agency and delivers the emergency earthquake alert to the mobile terminal 11.

The center apparatus 13 is a computer system managed by a carrier that provides a safety confirmation service. The center apparatus 13 receives the current location information transmitted from the mobile terminal 11 and registers a current location of the mobile terminal 11 and a transmission time (or reception time) of the current location information in a database 13a.

A destination which is a place to which the user goes at the disaster time is registered for each user in the mobile terminal 11. The user previously registers an address of the destination when using the safety confirmation service. The destination is generally his or her home or office; however, it is not limited to this, any place may be set as the destination. Upon receiving the current location information, the mobile terminal 11 transmits to the map server 14 destination information related to the destination of the user together with the current location information.

The map server 14 is a computer system managed by a carrier that provides a map service. The map service may be provided by the same carrier that provides the safety confirmation service. Upon receiving the current location information and destination information from the mobile terminal 11, the map server 14 creates the map information including a route from the current location to the destination and sends the map information back to the mobile terminal 11.

Figure 2:
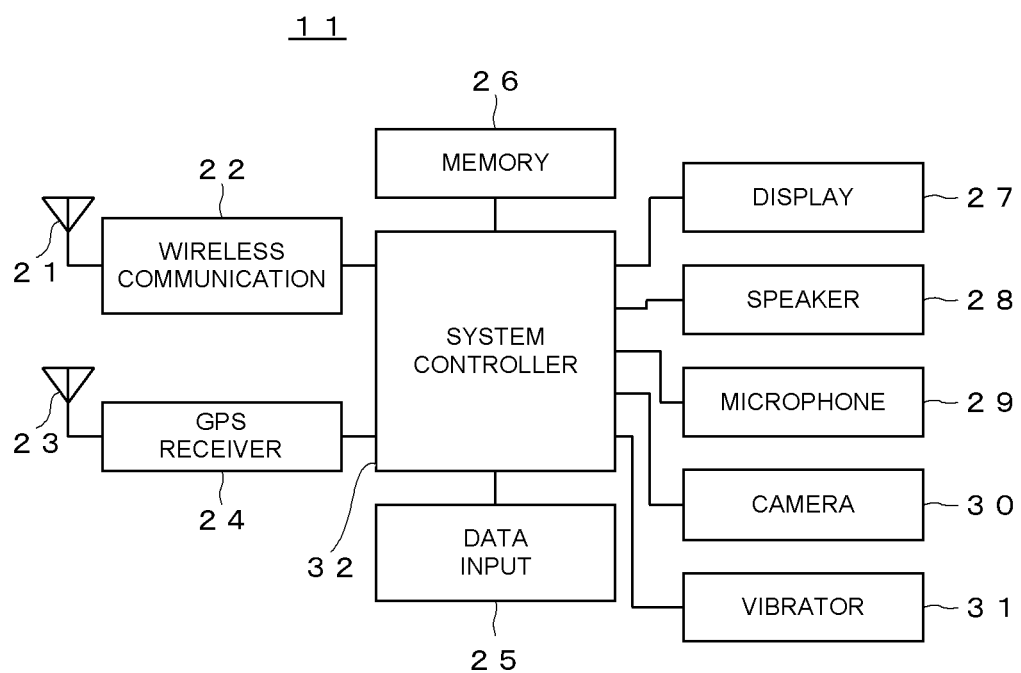
FIG. 2 is a block diagram illustrating a hardware configuration of the mobile terminal.

FIG. 2 is a block diagram illustrating a hardware configuration of the mobile terminal 11.

As illustrated in FIG. 2, the mobile terminal 11 includes an antenna 21, a wireless communication section 22 connected to the antenna 21, a GPS antenna 23, a GPS receiver 24 connected to the GPS antenna 23, a data input section 25 such as a keypad or a touch screen, a memory 26 that stores data or a computer program, a display 27 such as an LCD, a speaker 28, a microphone 29, a camera 30, a vibrator 31 that generates vibration, and a system controller 32 that controls the individual components.

The system controller 32 operates according to a computer program (software), whereby various functions of the mobile terminal 11 are realized. Well-known functions of the mobile terminal 11 include, for example, a voice communication function, an e-mailing function, a camera function, and a web-browsing function. Although details will be described later, the following functions are realized in the mobile terminal 11 according to the present embodiment: a location information acquisition function of receiving the GPS signal by turning ON a GPS reception mode upon receiving the emergency earthquake alert to acquire the current location information; a location information transmission function of transmitting the current location information to the center apparatus 13, a map information acquisition function of receiving and storing the map information transmitted from the center apparatus 13, a map display function of displaying the map information, and the like.

Figure 3:
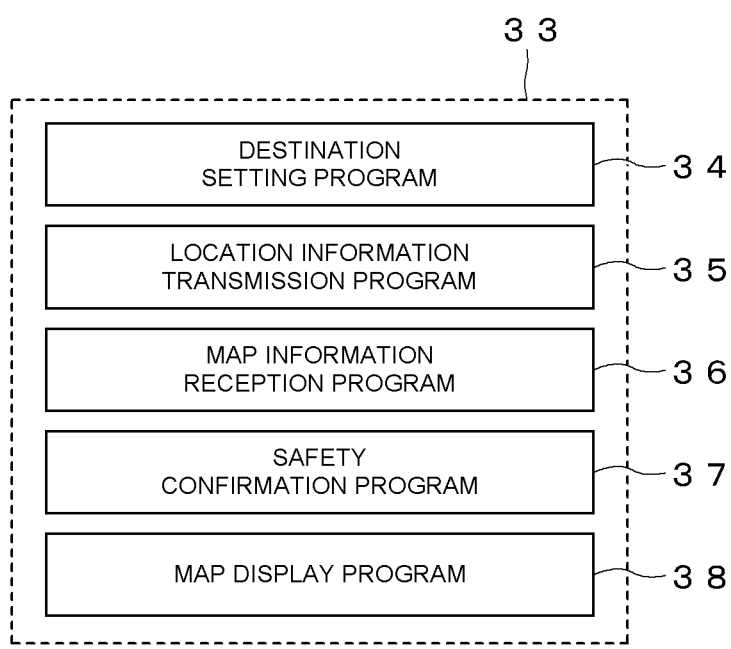
FIG. 3 is an exemplary view illustrating a part of the computer program implemented in the mobile terminal.

FIG. 3 is an exemplary view illustrating a part of the computer program implemented in the mobile terminal 11.

As illustrated in FIG. 3, there are installed in the mobile terminal 11 a destination setting program 34, a location information transmission program 35, a map information reception program 36, a safety confirmation program 37, and a map display program 38 as application programs for allowing the mobile terminal 11 to function as a safety confirmation terminal. Preferably, these programs are provided as one package program 33 and installed at a time. The software may be pre-installed before shipping or may be downloaded and installed by the user when he or she accesses the service.

The destination setting program 34, which is used when an initial setting or setting change is made, receives an input of the destination and holds the destination in the memory 26.

The location information transmission program 35 operates in a background and always monitors a receiving the emergency earthquake alert. The map information reception program 36 receives an instruction from the location information transmission program 35 to start its operation and receives the map information transmitted from the map server 14. The safety confirmation program 37 also receives an instruction from the location information transmission program 35 to start its operation, receives an input of the safety confirmation information, and transmits the input safety confirmation information.

A plurality of the destinations may be registered in the mobile terminal 11. For example, a home and an office of the user can be registered as first and second destinations, respectively. In this case, the location information transmission program 35 reads out the two destinations from the memory 26 and transmits the current location information and two destination information to the map server 14. Depending on a protocol between the mobile terminal 11 and map server 14, the current location information and two kinds of destination information may be transmitted simultaneously, or a combination of the current location information and the first destination information may be transmitted first, followed by a combination of the current location information and the second destination information.

Further, in a case where the plurality of destinations are registered as described above, one destination may automatically be selected from the plurality of destinations according to a place at the user has been involved in a disaster. This allows the destination to be switched between when being involved in the disaster at Tokyo and when being involved in the disaster at Osaka. In this case, a destination closest to the place at the user has been involved in the disaster is selected.

The destination may be, e.g., a temporary accommodation at a travel destination or a business trip destination. Such a destination is set as a third destination separately from the first and second destinations. The destination may be set by the user himself or herself directly inputting the destination or may be set utilizing information registered in a schedule database on the Internet. For example, assuming that information indicating that the user will stay at "Okinawa Hotel" on "May 5th" is registered in the schedule database, the location information of "Okinawa Hotel" is temporarily registered in association with the information of the schedule database as a limited destination on "May 5th".

The map display program 38 is not executed until the user activates it. Upon activation of the map display program 38, the map information including a return route to the destination (home, etc.) is displayed on the display 27 of the mobile terminal 11 in a case where the mobile terminal 11 has received the map information from the map server 14.

Figure 4:
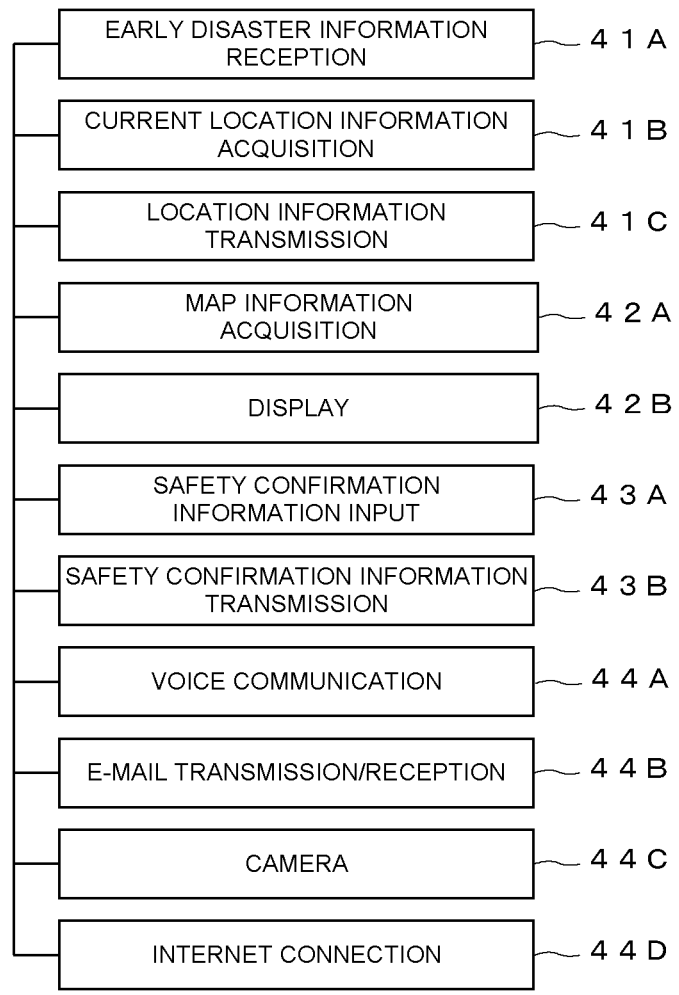
FIG. 4 is a functional block diagram of the mobile terminal.

FIG. 4 is a functional block diagram of the mobile terminal 11.

As illustrated in FIG. 4, the mobile terminal 11 functionally includes an early disaster information reception section 41A, a current location information acquisition section 41B, a location information transmission section 41C, a map information acquisition section 42A, a display section 42B, a safety confirmation information input section 43A, and a safety confirmation information transmission section 43B. The early disaster information reception section 41A receives early disaster information. The current location information acquisition section 41B automatically acquires the current location information at a time when the early disaster information reception section 41A has received the early disaster information. The location information transmission section 41C automatically transmits the current location information to the center apparatus 13 and the map server 14, as well as automatically transmits the current location information and the destination information to the map server 14. The map information acquisition section 42A receives and stores the map information including a return route from the current location to the destination. The display section 42B displays the map information. The safety confirmation information input section 43A receives an input of the safety confirmation information after the transmission of the current location information. The safety confirmation information transmission section 43B transmits the safety confirmation information to the center apparatus 13. In addition to the above, the mobile terminal 11 includes typical functions such as a voice communication section 44A, an e-mail transmission/reception section 44B, a camera section 44C, and an Internet connection section 44D.

The above functional blocks are realized by cooperation between the hardware of the mobile terminal 11 illustrated in FIG. 2 and the above-described software. More specifically, the early disaster information reception section 41A, the current location information acquisition section 41B, and the location information transmission section 41C are realized by cooperation between the hardware and the location information transmission program 35. The map information acquisition section 42A and the display section 42B are realized by cooperation among the hardware, the map information reception program 36, and the map display program 38. The safety confirmation information input section 43A and the safety confirmation information transmission section 43B are realized by cooperation between the hardware and the safety confirmation program 37.

Figure 5:
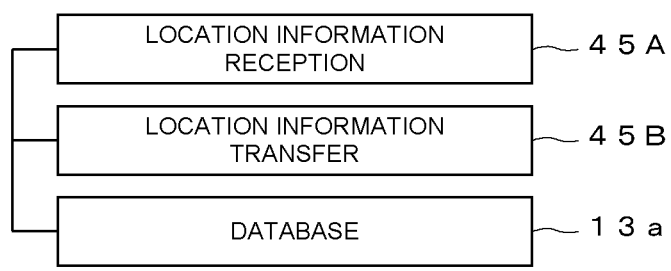
FIG. 5 is a functional block diagram of the center apparatus.

FIG. 5 is a functional block diagram of the center apparatus 13.

As illustrated in FIG. 5, the center apparatus 13 includes a location information reception section 45A that receives the current location information transmitted from the mobile terminal 11 and a location information transfer section 45B that transfers the current location information to another mobile terminal 18. The center apparatus 13 further includes the database 13a. The current location information is registered in the database 13a upon occurrence of the earthquake. That is, a field of the current location information is null before the occurrence of the earthquake.

Figure 6:
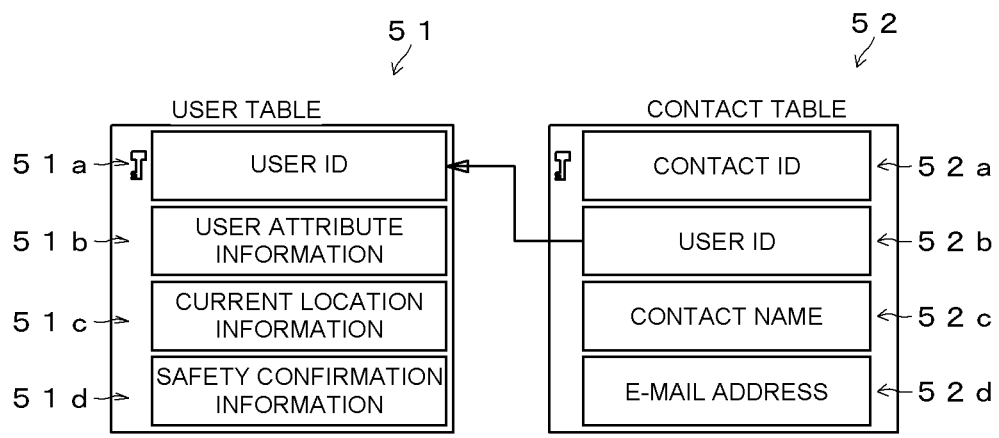
FIG. 6 is a view illustrating an example of a configuration of the database of the center apparatus.

FIG. 6 is a view illustrating an example of a configuration of the database 13a of the center apparatus 13.

As illustrated in FIG. 6, the database 13a includes a user table 51 and a contact table 52. Each record of the user table 51 includes fields of "user ID" 51a, "user attribute information" 51b, "current location information" 51c, "safety confirmation information" 51d, and the like. Each record of the contact table 52 includes fields of "contact ID" 52a, "user ID" 52b, "contact name" 52c, "e-mail address" 52d, and the like.

The "user ID" 51a is a main key of the user table 51. The "user attribute information" 51b is information such as user's name, home address, business address, mobile number, e-mail address and includes a plurality of fields. The "current location information" 51c and "safety confirmation information" 51d are each a field in which the current location information to be transmitted from the mobile terminal 11 upon occurrence of the earthquake is registered. Thus, the fields of the "current location information" 51c and "safety confirmation information" 51d are each null before the occurrence of the earthquake.

The "contact ID" 52a is a main key of the contact table 52. The "user ID" 52b is used for association with respective records of the user table 51. In the present embodiment, the user can register a plurality of contact points and thus the records of the user table 51 and contact table 52 have a one-to-multiple relationship. The "contact name" 52c is a field in which a name of an owner of an e-mail address and the like is registered. The "e-mail address" 52d is a field in which the e-mail address of a person to whom the user of the mobile terminal 11 wants to transmit the current location information and the safety confirmation information is registered.

Next, with reference to a flowchart of FIG. 7, operation of the safety confirmation system 10 will be described in detail.

Figure 7:
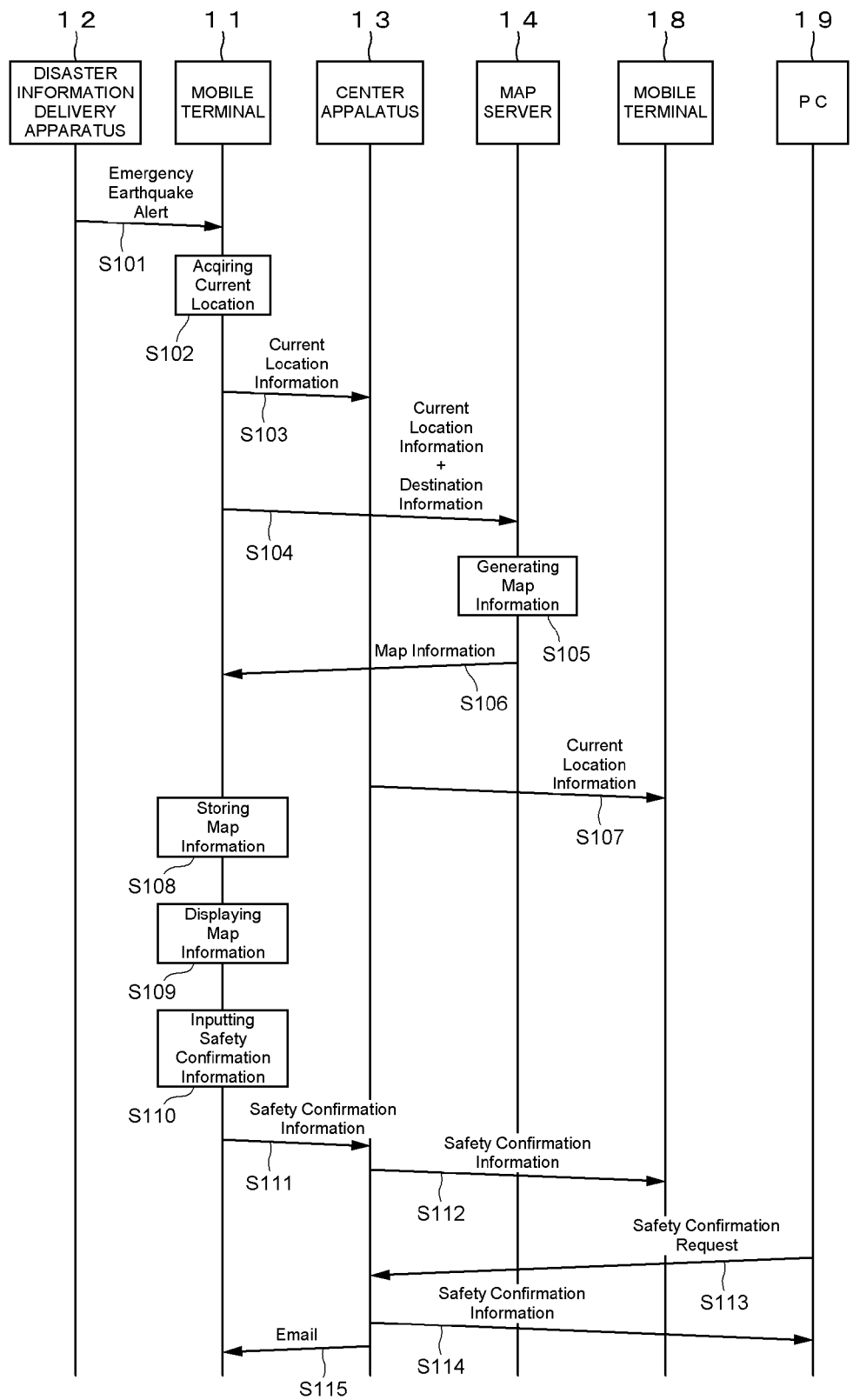
FIG. 7 is a flowchart showing an operation of the safety confirmation system.

As shown in FIG. 7, when an earthquake has occurred, the disaster information delivery apparatus 12 delivers the emergency earthquake alert and whereby the mobile terminal 11 within a disaster area receives the emergency earthquake alert (step S101).

Upon receiving the emergency earthquake alert, the mobile terminal 11 acquires the GPS signal with the reception of the emergency earthquake alert as a trigger (step S102) and transmits the GPS signal to the center apparatus 13 as the current location information (step S103). Further, the mobile terminal 11 transmits the current location information and the destination information to the map server 14. A time required from reception of the emergency earthquake alert to transmission of the current location information and the destination information is very short, so that the mobile terminal 11 can transmit the current location information before the communication lines become busy.

Upon receiving the current location information and destination information, from the mobile terminal 11, the map server 14 searches for a shortest path from the current location to the destination and generates the map information including the shortest path (step S105). As described above, the map indicates the current location and the destination and highlights the shortest path from the current location to the destination (step S106). The map server 14 sends the map information back to the mobile terminal 11.

The center apparatus 13 transmits the current location information of the user to another mobile terminal 18 (step S107). Although the current location information to be transmitted at this time only includes the current location of the user of the mobile terminal 11, a user of the mobile terminal 18 can grasp the current location of the user of the mobile terminal 11 by using a given map program installed in the mobile terminal 18 or an external map service.

A time required from reception of the emergency earthquake alert to reception of the map information is very short, so that the mobile terminal 11 can transmit the map information before (within five minutes from the occurrence of the earthquake) the communication lines become busy.

Upon receiving the map information, the mobile terminal stores the map information, and displays the map information on a screen of the mobile terminal 11 in response to the request of the user (steps S108 and S109). The map information is forcibly loaded into the mobile terminal 11 and thus the user cannot access the map server 14 and download the map information at his or her convenience. When the user operates the mobile terminal 11 to instruct display of the map information, the map information is displayed on the screen of the mobile terminal 11, so that he or she can try to walk toward the destination with the help of the map.

Thereafter, the user can input the safety confirmation information to the mobile terminal 11 and transmits the input information (steps S110 and S111). The safety confirmation information is transferred from the center apparatus 13 to the mobile terminal 18 as the contact point (step S112).

The safety confirmation information may be binary information indicating "safe" or "not safe" or may be multivalued information indicating a detailed status such as "safe", "minor injury", or "severe injury". Further, the safety confirmation information may include user's comment. Furthermore, the safety confirmation information may include not only the safety status of the user himself or herself, but also the safety status of family members or friends. Furthermore, information indicating whether houses or buildings have been collapsed or not may be included.

The safety confirmation information is transmitted by operation of the user of the mobile terminal 11 rather than being transmitted automatically by the mobile terminal 11. Thus, the safety confirmation information is generally transmitted after the user has ensured the safety of himself or herself and has calmed down, that is, after elapse of about five minutes from the end of the earthquake. After elapse of a certain time from the end of the earthquake, many people start calling or emailing, and thus mobile-service providers previously restrict mobile phone lines so as to prevent their lines from being flooded. Thus, it is not actually possible to transmit the safety confirmation information over the mobile phone lines. However, if the mobile terminal 11 has a wireless LAN function, the user can transmit the safety confirmation information not over the mobile phone lines but through the Internet 17 by using the wireless LAN function.

The safety confirmation information transmitted from the mobile terminal 11 to center apparatus 13 can be confirmed on the personal computer 19 through the Internet 17. More specifically, when a specified web site is accessed from the personal computer 19 (step S113), HTML data including the safety confirmation information is transferred from the center apparatus 13 to mobile terminal 11 (step S114), allowing the safety confirmation information to be confirmed on the personal computer 19. Since the transfer of the safety confirmation information to the mobile terminal 18 (step S112) cannot be made under a situation where the public communication lines are shut down or restricted, transfer of the safety confirmation information through the Internet is very effective.

Thereafter, the center apparatus 13 can transmit e-mail to the mobile terminal 11 of a user whose safety has been confirmed based on the safety confirmation information (step S115). This e-mail is, e.g., business contact to be transmitted to gather staff for recovery of a disaster-stricken office. Thus, the e-mail is transmitted to a user whose safety has been confirmed based on the safety confirmation information and who has been involved in the disaster at a place comparatively close to his or her office.

Further, the above e-mail is preferably transmitted to a user whose home is located comparatively close to his or her office. This is because even if a user himself or herself is safe, it is difficult for him or her to get to the office in a situation where traffic is jammed. The distance between the house and office can be found by referring to the addresses of the home and office that have been registered by the user of the mobile terminal 11 when he or she accesses the service for the first time. The center apparatus 13 transmits the addresses of the home and office to the map server 14. The map server 14 calculates the distance between the home and office and sends a result of the calculation back to the center apparatus 13 as distance information. The center apparatus 13 transmits the e-mail to the mobile terminal 11 of a user whose house is located within a certain linear distance from the office to ask for emergency attendance.

As described above, in the present embodiment, the mobile terminal 11 sequentially and automatically performs a series of processes from reception of the emergency earthquake alert to acquisition of the map information without intervention of determination or operation of the user. Therefore, the series of processes can be completed before (e.g., within five minutes from the occurrence of the earthquake) the communication lines become busy.

Although the present invention has been described based on the preferred embodiment, the present invention is not limited to the above embodiment and various modifications may be made within the scope of the present invention. Accordingly, all such modifications are included in the present invention.

For example, the disaster information delivery apparatus 12 delivers the emergency earthquake alert as the disaster information in the above embodiment. However, the disaster information in the present invention is not limited to the emergency earthquake alert, but may be various information related to a disaster such as Tsunami warning, typhoon warning, and information of fires.

Further, although the emergency earthquake alert is delivered only to the mobile terminal 11 present within an area affected by the earthquake in the above embodiment, the present invention is not limited to this. For example, a configuration may be adopted in which the disaster information delivery apparatus 12 delivers the emergency earthquake alert to all the mobile phones 11 participating in the service, and individual users of the mobile terminals 11 determine whether their locations are affected by the earthquake from the location information.

What is claimed is:

1. A safety confirmation system comprising:
   a mobile terminal that receives early disaster information;
   a center apparatus that manages a safety status of a user of the mobile terminal; and
   a map server that provides map information, wherein the mobile terminal includes:
      a processor;
      a display; and
      a memory having a program, when executed, causing the processor to perform the following processes:
      a registration process to register destination information before receiving the early disaster information; and
      a post disaster process early disaster information, without intervention of a user of the mobile terminal, the post disaster process including:
         acquiring current location information;
         transmitting the current location information to the center apparatus and the map server, and transmitting the destination information to the map server;
         receiving and storing map information including a return route from a current location to a destination for displaying the map information on the display;
   the map server includes:
      a return route search section that searches for a return route from the current location to a destination based on the current location information and destination information;
      a map information generation section that generates the map information including the return route; and
      a map information transmission section that transmits the map information to the mobile terminal; and
   the center apparatus includes a location information reception section that receives the current location information transmitted from the mobile terminal, wherein
   the destination information includes first and second destinations,
   the mobile terminal transmits the current location information and the first and second destinations to the map server, and
   the map server transmits to the mobile terminal first map information including a return route from the current location to the first destination and second map information including a return route from the current location to the second destination.

2. The safety confirmation system as claimed in claim 1, wherein the center apparatus further includes a location information transmission section that automatically transmits, upon receiving the current location information from the mobile terminal, the current location information to another mobile terminal.

3. The safety confirmation system as claimed in claim 1, wherein the mobile terminal further includes
   a safety confirmation information input section that receives an input of safety confirmation information after automatically transmitting the current location information and
   a safety confirmation information transmission section that transmits the safety confirmation information and the center apparatus further includes
   a safety confirmation information reception section that receives the safety confirmation information and
   a safety confirmation information management section that manages the safety confirmation information.

4. The safety confirmation system as claimed in claim 3, wherein the center apparatus automatically transmits, upon receiving the safety confirmation information from the mobile terminal, the safety confirmation information to another mobile terminal.

5. A mobile terminal comprising:
   a processor;
   a display; and
   a memory having a program, when executed, causing the processor to perform the following processes:
   a registration process to register destination information before receiving early disaster information; and
   a post disaster process performed responsive to the reception of the early disaster information, without intervention of a user of the mobile terminal, the post disaster process including:
   acquiring current location information;
   transmitting the current location information to a center apparatus and the map server, and transmitting the destination information to the map server;
   receiving and storing map information including a return route from a current location to a destination for displaying the map information on the display, wherein
   the destination information includes first and second destinations,
   the mobile terminal transmits the current location information and the first and second destinations to the map server, and
   the map server transmits to the mobile terminal first map information including a return route from the current location to the first destination and second map information including a return route from the current location to the second destination.

6. The mobile terminal as claimed in claim 5 further includes:

a safety confirmation information input section that receives an input of safety confirmation information after automatically transmitting the current location information; and a safety confirmation information transmission section that transmits the safety confirmation information to the center apparatus.

7. A safety confirmation method executed by a mobile terminal having an early disaster information reception function and a location information acquisition function, the method including the steps of:

registering destination information before receiving the early disaster information;

automatically acquiring current location information upon receiving the early disaster information;

automatically transmitting the current location information to a center apparatus and a map server, and automatically transmitting the destination information to the map server;

receiving and storing map information including a return route from a current location to a predetermined destination for displaying the map information, wherein the destination information includes first and second destinations, the mobile terminal transmits the current location information and the first and second destinations to the map server, and the map server transmits to the mobile terminal first map information including a return route from the current location to the first destination and second map information including a return route from the current location to the second destination.

8. The safety confirmation method as claimed in claim 7 further includes the steps of:

receiving an input of safety confirmation information after automatically transmitting the current location information; and transmitting the safety confirmation information to the center apparatus.

* * * * *